United States Patent
Maurice et al.

(10) Patent No.: US 6,577,085 B2
(45) Date of Patent: *Jun. 10, 2003

(54) CONTROL OF A BRUSHLESS MOTOR

(75) Inventors: Bruno Maurice, Eguilles (FR); Jean-Marie Charreton, Bouc Bel Air (FR)

(73) Assignee: STMicroelectronics S.A., Gentilly (FR)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/246,398

(22) Filed: Feb. 9, 1999

(65) Prior Publication Data

US 2001/0040438 A1 Nov. 15, 2001

(30) Foreign Application Priority Data

Feb. 11, 1998 (EP) .............................. 98410010

(51) Int. Cl.⁷ .......................... H02K 23/00; H02P 1/18; H02P 3/08; H02P 5/06; H02P 7/06

(52) U.S. Cl. ...................... 318/254; 318/138; 318/439

(58) Field of Search ................... 318/254, 138, 318/439, 484, 487, 445

(56) References Cited

U.S. PATENT DOCUMENTS

| | | | | |
|---|---|---|---|---|
| 5,317,243 A | * | 5/1994 | Cameron .................... | 318/254 |
| 5,334,917 A | | 8/1994 | Lind ......................... | 318/254 |
| 5,481,166 A | * | 1/1996 | Moreira ..................... | 318/254 |
| 5,739,652 A | * | 4/1998 | Sriram ....................... | 318/439 |
| 5,767,643 A | | 6/1998 | Pham et al. ................. | 318/439 |
| 5,847,524 A | * | 12/1998 | Erdman et al. ............. | 318/439 |
| 5,859,520 A | | 1/1999 | Bourgeois et al. .......... | 318/805 |
| 5,905,348 A | * | 5/1999 | Nolan ........................ | 318/254 |
| 5,929,577 A | * | 7/1999 | Neidorff et al. ............ | 318/254 |
| 6,034,493 A | * | 3/2000 | Boyd et al. ................. | 318/254 |
| 6,067,202 A | * | 5/2000 | Rowan et al. .......... | 318/439 X |

FOREIGN PATENT DOCUMENTS

| | | | |
|---|---|---|---|
| DE | A-42 31 226 | 3/1994 | .......... H02K/29/06 |
| EP | A-0 801 463 | 10/1997 | ............. H02P/6/18 |
| FR | 2 747 521 A1 * | 10/1997 | ............. H02P/6/18 |

OTHER PUBLICATIONS

European Search Report from European Patent Application No. 98410010.7, filed Feb. 11, 1998.

* cited by examiner

*Primary Examiner*—Robert E. Nappi
*Assistant Examiner*—Edgardo San Martin
(74) *Attorney, Agent, or Firm*—Wolf, Greenfield & Sacks, P.C.; James H. Morris

(57) ABSTRACT

A method and apparatus for controlling a brushless motor having a plurality of windings switched through a sequence of steps includes determining a transition time from one step to the next. The transition time is determined by detecting a zero crossing of a back emf in one of the plurality of windings. A delayed time to be added to the transition time is determined wherein the delayed time is selected according to the step in the sequence of steps being executed and is dependent on the duration of one of a preceding interval between zero crossings. A delay time proportional to a duration of a last shortest interval is supplied to follow a longest interval. A delay time proportional to a duration of a last longest interval is supplied to follow a shortest interval and a delay time proportional to a duration of a medium interval is supplied to follow a medium interval. The method may be used, for example, with a star or delta connected motor having any number of windings.

13 Claims, 3 Drawing Sheets

CONTROL OF A BRUSHLESS MOTOR

BACKGROUND OF THE INVENTION

1. Field of the Invention

The present invention relates to the control of brushless motors, particularly in the system described in U.S. patent application Ser. No. 08/827,747, which is herein incorporated by reference.

2. Discussion of the Related Art

FIG. 1 shows a cross-sectional view of a typical brushless, DC motor. The motor includes a permanent magnet rotor 12 and a stator 14 having a number of windings (A, B, C shown in FIG. 2). The windings are disposed in a plurality of slots 18. The motor illustrated has rotor 12 housed within stator 14. Stator 14 may also be housed within rotor 12. Rotor 12 is permanently magnetized, and rotates to align its magnetic flux with the magnetic flux generated by the windings.

FIG. 2 shows an electrical diagram of the stator of such an electric motor, and of the supply control circuitry used. Often, such motors comprise three phases A, B, C. These may be connected in a star ('wye') configuration having a common node N (as in the drawing), or in a delta configuration. The free end of each winding is connected by a pair of switches XSA, XGA; XSB, XGB; XSC, XGC to supply Vs and ground GND voltages, respectively. A reverse-biased diode DSA, DGA; DSB, DGB; DSC, DGC is placed in parallel with each of the switches. The opening and closing of the switches may be controlled by a microcontroller.

As shown in FIG. 3, the switches are controlled according to a sequence of steps. The diagram shows the voltages VA, VB, VC applied to each winding, relative to common node N. The drawing shows the case of a motor having phases A, B, C, controlled through six steps s1, s2, s3, s4, s5, s6, each corresponding to a specific magnetic flux pattern in the motor. In each of the six steps, one of phases A, B, C is off, and the other two are oppositely polarized. The rotor aligns its magnetic flux with that of the stator, and thus rotates synchronously with the stator flux, as it rotates due to the switching of the six steps.

When the rotor rotates, its rotation induces a back emf voltage in each of the windings of the motor. For a loaded motor, the back emf generated in a winding is approximately in phase with the current flowing in the same winding.

FIG. 4 shows the six steps of voltage VA applied across winding A, of back emf BemfA generated in winding A by the rotor under load, and of current IA through winding A. The periods of increasing current and decreasing current are respectively called the energizing period (pe) and the de-energizing period (pd). Extending between the de-energizing period and the energizing period is a surveillance period td, during which the back emf may be monitored.

The voltage effectively issued to each of the motor windings is controlled by pulse-width modulation (PWM) of the DC supply voltage. The frequency of the pulse-width modulation signal is usually high with respect to the rotating frequency of the motor, for example, of approximately 10 kHz. The switches are controlled by a microcontroller according to the current to be issued to the motor to ensure the switching between steps s1 to s6 and to ensure the PWM control.

During low level periods between PWM pulses, the motor turns in free wheel; the kinetic energy of the motor as it turns is transformed into electric energy by its rotation in a magnetic field. The motor does not slow down during these periods since the high values of the PWM frequency, of the motor inertia and of its load make these changes undetectable.

For the motor to operate properly, the flux existing in the stator must always be slightly advanced with respect to the rotor in order to pull the motor forward. Also, the flux in the stator just behind the rotor is advantageously of a polarity adapted to repelling the rotor to help the synchronization. However, if the synchronization between the rotor motion and the flux rotation is lost, the rotor may stop rotating or may operate with a poor efficiency. Accordingly, to optimize the motor efficiency, the switching of the windings from one step to another must be controlled according to the effective position of the rotor. For this purpose, in a self-commutated motor operating mode, the back emf induced in the windings and more specifically the zero crossing points of this back emf are monitored to determine the position of the rotor at a given time.

U.S. patent application Ser. No. 08/827,747 provides a control circuit of a brushless electric motor in which the transition from one step to the following is determined by a zero crossing of the back emf in a winding which is not supplied with a voltage during this step.

More specifically, U.S. patent application Ser. No. 08/827,747 provides a method of control of a brushless motor having a plurality of windings, each of which has a first end connected to a common node and a second end which can be connected to supply voltages, including the following steps:

a) applying an upper supply voltage to a second end of each of a first subset of windings, applying a lower supply voltage to a second end of each of a second subset of windings, the second end of at least one winding being disconnected from the supply voltages; the application of the supply voltage to at least one of the first and second subsets being periodically interrupted;

b) detecting the presence of a current in the disconnected winding, then detecting a stopping time of the current;

c) beginning at the stopping time, monitoring the value of a back emf induced in the disconnected winding and detecting a zero crossing point of the back emf with respect to the upper and/or lower supply voltage;

d) counting down a predetermined delay from the detected zero crossing point; and e) after the end of the predetermined delay, removing the supply voltages from the second ends of the first and second subsets of windings and applying the upper supply voltage to a second end of each of a third subset of windings; applying the lower supply voltage to a second end of each of a fourth subset of windings; the second end of at least one winding remaining unconnected to the supply voltages.

According to U.S. patent application Ser. No. 08/827,747 the predetermined delay is a predetermined fraction of the duration taken to perform a previous cycle of steps b) to e), this predetermined fraction being likely to be modified during operation of the motor.

The applicant has noted that, in the case where the motor exhibits a magnet disymmetry or is magnetically deformed, or if the mechanical symmetry of the stator is not exactly the same as that of the rotor, the electric position information corresponding to the zero crossing of the back emf is not steady in time although the rotor speed is steady.

In the case where a delay T which is proportional to the duration of the directly preceding interval appears between zero crossings, an increased disymmetry appears.

The present invention aims at overcoming this disadvantage.

SUMMARY OF THE INVENTION

The present invention provides a self-commutated type method of control of a brushless motor having a plurality of windings switched according to a determined cycle of steps, in which each transition between steps is determined at a time following a zero crossing of the back emf by a determined delay. This delay is chosen selectively according to the step involved, depending on the duration of a determined one of the preceding intervals between zero crossings.

According to an embodiment of the present invention, the method includes determining, for a motor rotating at constant speed, the duration of the intervals between zero crossings of the back emf, having the longest interval followed by a delay proportional to the duration of the last shortest interval, having the shortest interval followed by a delay proportional to the duration of the last longest interval, and having the intervals of medium duration followed by a delay proportional to the duration of the last interval of medium duration.

According to an embodiment of the present invention, the method consists of having each detection of a zero crossing of the back emf followed by a delay proportional to the duration of a interval shifted from the step under way by a determined number of steps.

According to an embodiment of the present invention, a circuit for controlling a brushless motor includes a switching control circuit providing a voltage to a winding according to a cycle of steps, wherein the cycle includes a transition time between steps, a detection circuit detecting a zero crossing point of a back emf voltage in a winding of the motor, and a timer adding a delay to the transition time, wherein the delay is selected according to a step being executed and wherein the delay is dependent on the duration of one of a preceeding intervals between zero crossing points.

BRIEF DESCRIPTION OF THE DRAWINGS

The foregoing objects, features and advantages of the present invention, will be discussed in detail in the following non-limiting description of an example embodiment in connection with the accompanying drawings, among which.

DETAILED DESCRIPTION

Although it will not be described in detail, the control signals generated to govern the operation of various circuit elements in the circuit according to the present invention may be generated by a host microcontroller, for example, a microcontroller of family ST72xx or ST9xxx manufactured by STMicroelectronics.

When a zero crossing point of the back emf is detected, a delay is imposed from that point until the next step transition. This variable delay is selected by the host microcontroller according to the instantaneous speed of the motor to achieve a maximum efficiency and an optimal torque of the motor. The measurement of the back emf is performed during "off" periods of the PWM.

Thus, in a self-commutating mode, the detection of the zero crossing point of the back emf in a given winding is used to trigger the turn-on point of the current through the same winding. This control is applied with a delay T/x after the zero crossing point, where T is the duration of the step, and x being a constant determined to obtain the best possible operation of the motor. Constant x is adjusted in real time to take account of variations in the mechanical loading of the motor, of the required acceleration, of the required stability and efficiency.

Figure 1:
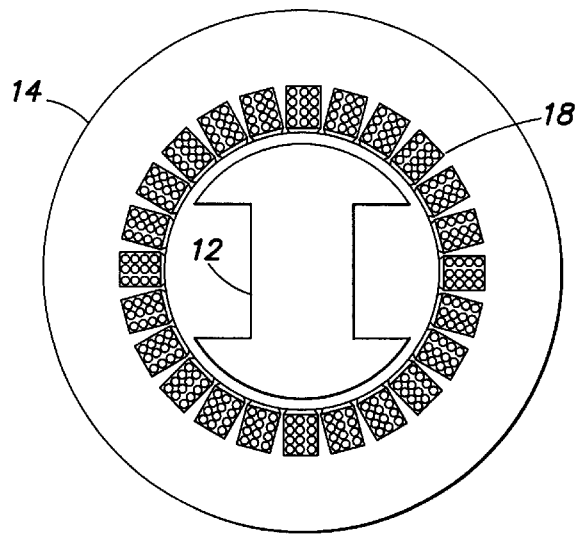
FIG. 1 shows a cross-section of a known brushless motor.
Figure 2:
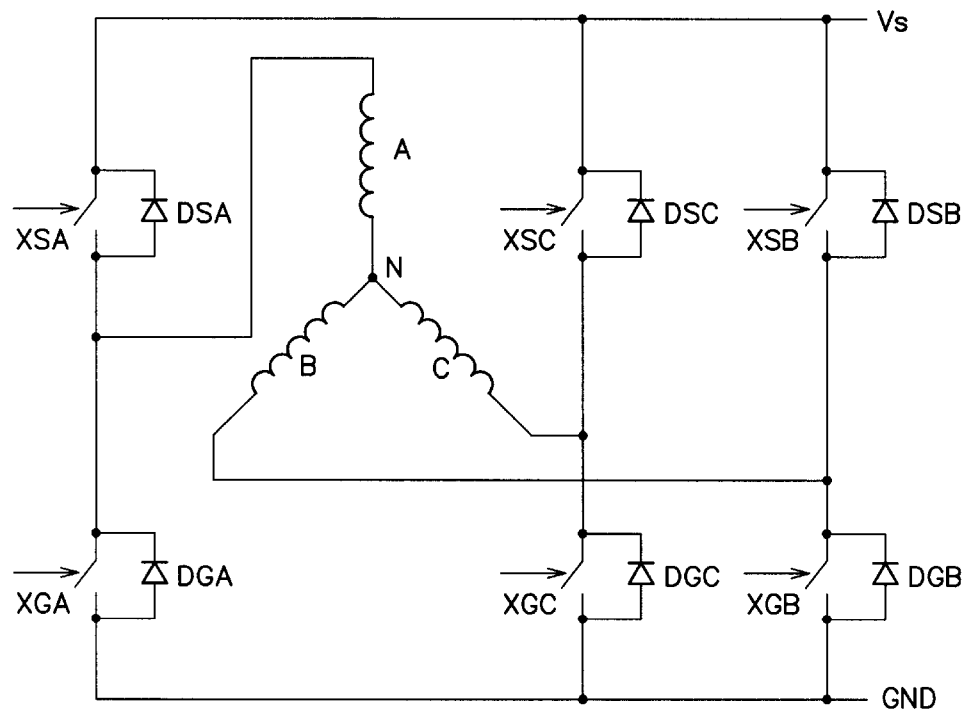
FIG. 2 shows a known circuit for controlling the motor of FIG. 1.
Figure 3:
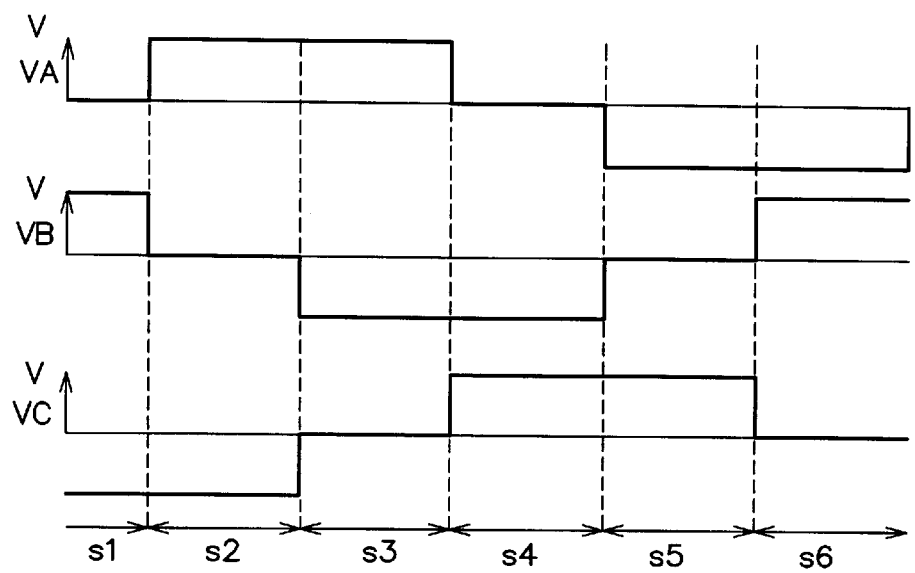
FIG. 3 shows voltages applied to parts of the circuit of FIG. 2.
Figure 4:
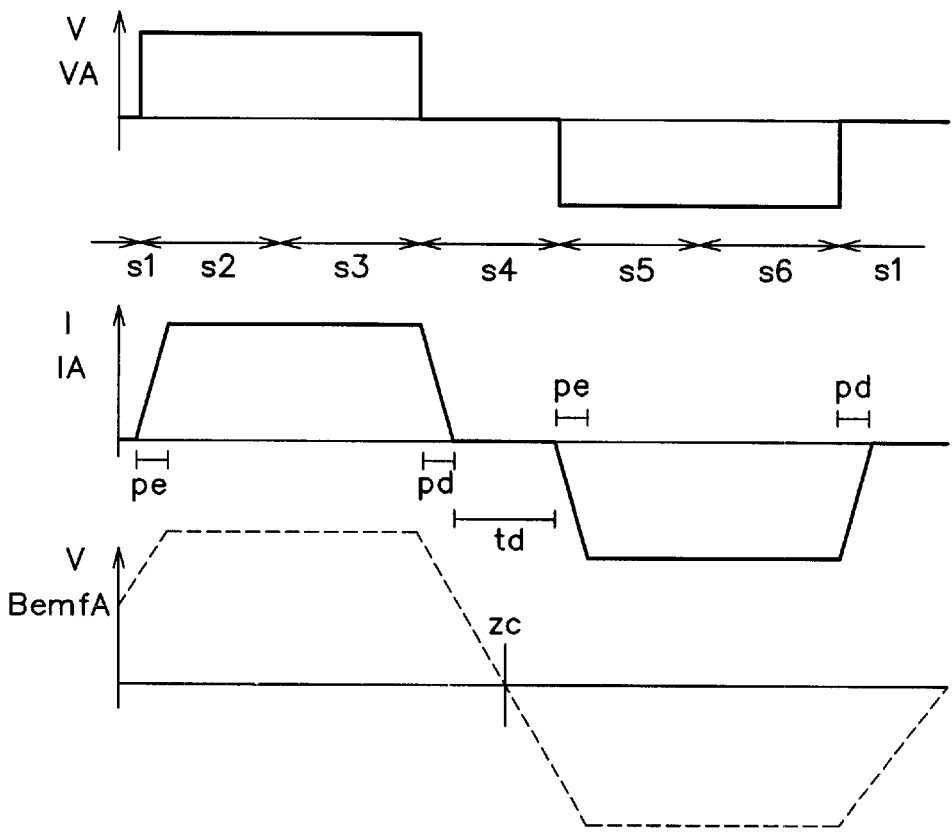
FIG. 4 shows currents and voltages in the windings of a motor.
Figure 5A:
FIGS. 5A and 5B show, during the rotation of a motor, respectively, times of detection of zero crossings and times of switching of the windings of a motor, according to the state of the art.
Figure 5B:
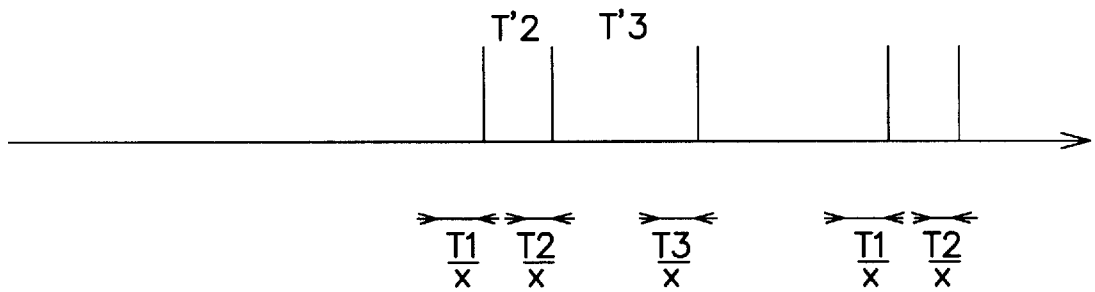

FIGS. 5A and 5B illustrate a succession of operation steps of a motor in the case where said motor has mechanical disymmetries. In FIG. 5A, the successive operation steps, such as detected by the successive zero crossings of the back emf, have been shown. In one embodiment, it is assumed that the motor has a mechanical disymmetry of the third order. Unequal intervals T1, T2, T3 then appear between successive zero crossings of the back emf, whereas, if the motor operates at constant speed and everything is properly set, all three intervals T1, T2, T3 should be identical. Interval T3 is shown as having a normal value and interval T1 is shown as being much longer than interval T2. In the conventional case, starting from the zero crossings of the back emf, corresponding to the end of each of intervals T1, T2, T3, a switching mode transition of the several motor parts is triggered after a delay T/x, where T corresponds to the duration of the directly preceding interval. Then, as shown in FIG. 5B, it can be seen that the longest interval T1 is followed by a long delay T1/x, while the end of the shortest interval T2 is followed by a short delay T2/x. Thus, in the next operating cycle, phase T'2 will be still shorter than preceding phase T2 while phase T'3 corresponding to T3 will be lengthened. Accordingly, the existence of a mechanical disymmetry in the motor structure causes an increased disymmetry of the step switching and the defects are worsened.

As a result, especially after a short interval, the idle time required for the detection of the back emf will be strongly reduced, which limits the maximum possible motor speed. As another result, the rotation of the stator flux will not be steady although the motor rotates steadily. This can cause vibrations, torque jerks, noise and a decrease in efficiency.

Thus, one embodiment of the present invention aims at taking into account the possible irregularities of a motor, that is, of the irregularities of the zero crossings of the back emf for a motor rotating at constant speed, to compensate these mechanical errors by an adapted triggering of the several switches of the motor windings.

Figure 6A:
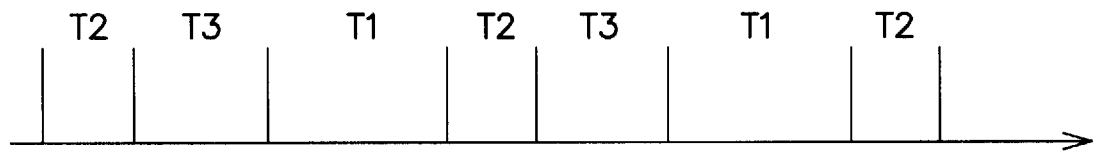
FIGS. 6A and 6B show, during the rotation of a motor, respectively, times of detection of zero crossings and times of switching of the windings of the motor according to an embodiment of the present invention.
Figure 6B:
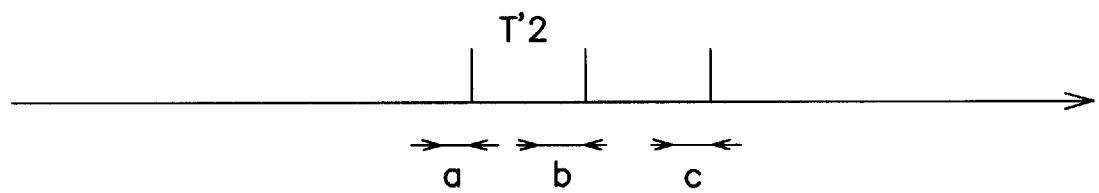

As is schematically shown in FIGS. 6A and 6B, in one embodiment the motor switchings are triggered with a short delay a immediately after a long interval T1 and with a longer delay b immediately after a short interval T2. Thus, duration T'2 between two transitions corresponding to a short interval will be lengthened with respect to duration T2 and not reduced as was the case in FIGS. 5A and 5B.

Those skilled in the art will find various means to reach such results, the control microcontroller being likely to take into account these various means by means of an adapted programmer. For example, the motor is first rotated at constant speed and the distribution of intervals T1, T2, T3 is checked. In the specific example of FIG. 6A, duration a can be calculated as corresponding to T2/x, duration b as corresponding to T1/x and duration c as corresponding to T3/x. It will of course be understood, as has been previously discussed, that durations T1, T2, T3 vary according to the rotation speed of the motor. In the specific case illustrated in FIGS. 6A and 6B, a duration (T2/x) corresponding to an interval twice prior to the step which has just ended (T1) will thus be selected for duration a, a duration (T1/x) corresponding to an interval just prior to the step which has just ended (T2) will be selected for duration b, and a duration (T3/x) corresponding to the interval which has just ended (T3) will be selected for duration c. In other cases, for example, but not exclusively in case of an disymmetry of second order, it could be systematically chosen to use as a calculation basis the duration of an interval preceding by one step the step which has just ended. Any other combination may be chosen according to the type of disymmetry and the desired sophistication of the correction method.

In one embodiment of the present invention, the disymmetry in the step switching is attenuated, the maximum speed of the motor is increased, the rotation speed of the rotor flux becomes steady, that is, the torque ripple, and thus the noise, is reduced while the efficiency is increased. Further, the electric operation and the performances of the motor are less influenced by mechanical or magnetic defects and dimensional tolerances used in the motor construction.

The example has been described in relation with a star-connected motor. The same method may be used to control a delta-connected motor. Although described in relation with a three-winding motor, the method according to the present invention adapts simply to motors with more or less windings.

Although the present invention has been described in the specific case of an improvement to U.S. patent application Ser. No. 08/827,747, it should be noted that it generally applies to any system of control of a self-commutated brushless motor in which a transition between steps of energizing of the motor windings is determined by adding a given delay to the zero crossing time of the back emf in an unsupplied winding of the motor.

Having thus described several particular embodiments of the invention, various alterations, modifications, and improvements will readily occur to those skilled in the art. Such alterations, modifications, and improvements as are made obvious by this disclosure are intended to be part of this disclosure though not expressly stated herein, and are intended to be within the spirit and scope of the invention. Accordingly, the foregoing description is by way of example only and is not intended to be limiting. The invention is limited only as defined in the following claims and equivalents thereto.

What is claimed is:

1. A self-commutated type method of control of a brushless motor having a plurality of windings switched according to a determined cycle of steps, in which each transition between steps is determined at a time following a zero crossing of a back emf by a determined delay, wherein the delay is chosen selectively according to the step involved by selecting an interval from a plurality of preceding intervals between zero crossings depending on a duration of the interval and by determining the delay based on the duration of the selected interval; further including the steps of:
    determining for a motor rotating at a constant speed the duration of the intervals between zero crossings of the back emf;
    providing a delay proportional to the duration of a last shortest interval following a longest interval;
    providing a delay proportional to the duration of a last longest interval following a shortest interval; and
    providing a delay proportional to the duration of a last interval of medium duration following an interval of medium duration.

2. A method for controlling a brushless motor having a plurality of windings switched through a sequence of steps, the method comprising:
    determining a transition time from one step to the next by detecting a zero crossing of a back emf in one of the plurality of windings including:
        determining a delay time to be added to the transition time, wherein the delay time is selected according to the step in the sequence of steps being executed based upon a duration of a preceding interval, and
        selecting the interval from among the preceding intervals between zero crossings based on the duration of the interval;
    wherein the step of determining the delay time further includes:
        determining a duration of an interval between zero crossings of the back emf;
        supplying a delay time proportional to a duration of a last shortest interval to follow a longest interval;
        supplying a delay time proportional to a duration of a last longest interval to follow a shortest interval; and
        supplying a delay time proportional to a duration of a medium interval to follow a medium interval.

3. The method of claim 2, wherein the delay time is used to control a star-connected motor.

4. The method of claim 2, wherein the delay time is used to control a delta-connected motor.

5. A circuit for controlling a brushless motor comprising:
    a switching control circuit providing a voltage to a winding of the motor according to a cycle of steps, wherein the cycle includes a transition time between steps;
    a detection circuit detecting a zero crossing point of a back emf voltage in a winding of the motor which is not supplied with a voltage; and
    a timer adding a delay to the transition time, wherein the delay is selected according to a step being executed by selecting an interval from a plurality of preceding intervals between zero crossing points depending on a duration of the interval and by determining the delay based on the duration of the selected interval;
    wherein the delay is proportional to a duration of a last shortest interval following a longest interval, the delay is proportional to a duration of a last longest interval following a shortest interval, and the delay is proportional to a duration of a medium interval following a medium interval.

6. The circuit of claim 5, wherein the motor is star-connected.

7. The circuit of claim 5, wherein the motor is delta-connected.

8. In a motor having a plurality of windings having connections that can be switched to provide a plurality of configurations, the motor operating by transitions between the plurality of configurations, a method of determining a delay between a detected event and a transition, the method comprising acts of:

determining the delay based on a duration of an interval selected from a plurality of preceding intervals between transitions;

selecting the interval based on the duration of the interval;

wherein determining the delay includes determining the delay based on a period of the interval between transitions during a previous occurrence of a current configuration; and wherein selecting the interval includes selecting an interval having a longest duration when the period is less than a duration of each of the plurality of preceding intervals.

9. The method of claim 8, wherein the detected event is a zero crossing of a back emf in at least one of the plurality of windings.

10. The method of claim 8, wherein selecting the interval includes selecting an interval having a shortest duration when the period is greater than a duration of each of the plurality of preceding intervals.

11. An apparatus for controlling a motor comprising:

a plurality of windings having a first end connected to a plurality of switches, the switches adapted to connect and disconnect the windings from a voltage source to provide a plurality of configurations corresponding to different magnetic flux patterns when in operation;

a timing circuit to provide a timing signal based on a condition of the motor;

a controller operatively coupled to the switches to control transitions between the plurality of configurations, the controller adapted to provide a delay between the timing signal and a transition, wherein, when in use, the delay is determined by selecting an interval from among a plurality of preceding intervals between transitions based on a duration of the interval, and determining the delay based on the duration;

wherein the controller transitions between the plurality of configurations in a predetermined and periodic order;

wherein the timing signal is provided upon detection of a zero crossing of a back emf in a disconnected winding;

further comprising a storage device for recording a step time related to a duration each winding is connected before being disconnected during a single period of the predetermined order; and wherein a preceding interval having a longest duration is selected when a winding disconnected in a current configuration has the shortest recorded step time and a preceding interval having a shortest duration is selected when the winding disconnected in the current configuration has the longest recorded step time.

12. The apparatus of claim 11, further comprising a common node connected to a second end of the plurality of windings.

13. The apparatus of claim 11, wherein a second end of the plurality of windings is connected to a second end of at least one other of the plurality of windings.

* * * * *